United States Patent [19]

Dawkins

[11] 4,051,691
[45] Oct. 4, 1977

[54] AIR CONDITIONING APPARATUS

[76] Inventor: Claude W. Dawkins, 4900 NW. 30 St., Oklahoma City, Okla. 73122

[21] Appl. No.: 729,873

[22] Filed: Oct. 5, 1976

Related U.S. Application Data

[63] Continuation-in-part of Ser. No. 581,102, May 27, 1975, Pat. No. 3,984,224, which is a continuation-in-part of Ser. No. 423,280, Dec. 10, 1973, Pat. No. 3,885,398.

[51] Int. Cl.² .................................................. F25B 27/00
[52] U.S. Cl. ..................................... 62/236; 62/243; 62/244; 62/510
[58] Field of Search ................. 62/228, 229, 236, 239, 62/243, 244, 259, 510; 296/28 R

[56] References Cited

U.S. PATENT DOCUMENTS

| 2,054,350 | 9/1936 | Weiland | 62/244 |
|---|---|---|---|
| 2,513,679 | 7/1950 | Ritter | 62/239 |
| 2,784,568 | 3/1957 | Schjolin | 62/239 |
| 2,869,333 | 1/1959 | Hoiby | 62/259 |
| 2,907,182 | 10/1959 | Kuklinski | 62/236 |
| 3,218,821 | 11/1965 | Spatt | 62/244 |
| 3,315,488 | 4/1967 | Lind | 62/259 |
| 3,347,310 | 10/1967 | Lind | 62/259 |
| 3,719,058 | 3/1973 | Waygood | 62/243 |

Primary Examiner—Ronald C. Caposella
Attorney, Agent, or Firm—Dunlap, Codding & McCarthy

[57] ABSTRACT

A refrigeration type air conditioning apparatus employing a heat transfer medium for use in a vehicle having a large passenger area, comprising a vehicle engine driven compressor and a pair of electric motor driven compressors, all of which are connected to a pair of condenser coils via a discharge manifold and to a split evaporator coil via a suction manifold while each of the condenser coils is connected to one half of the evaporator coil via an expansion valve.

6 Claims, 4 Drawing Figures

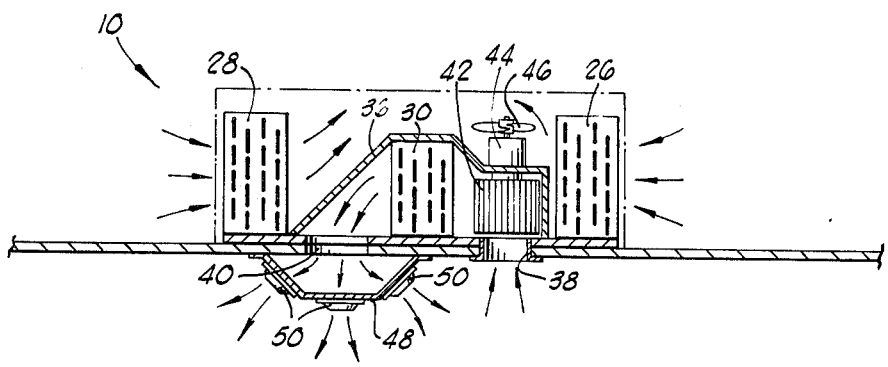
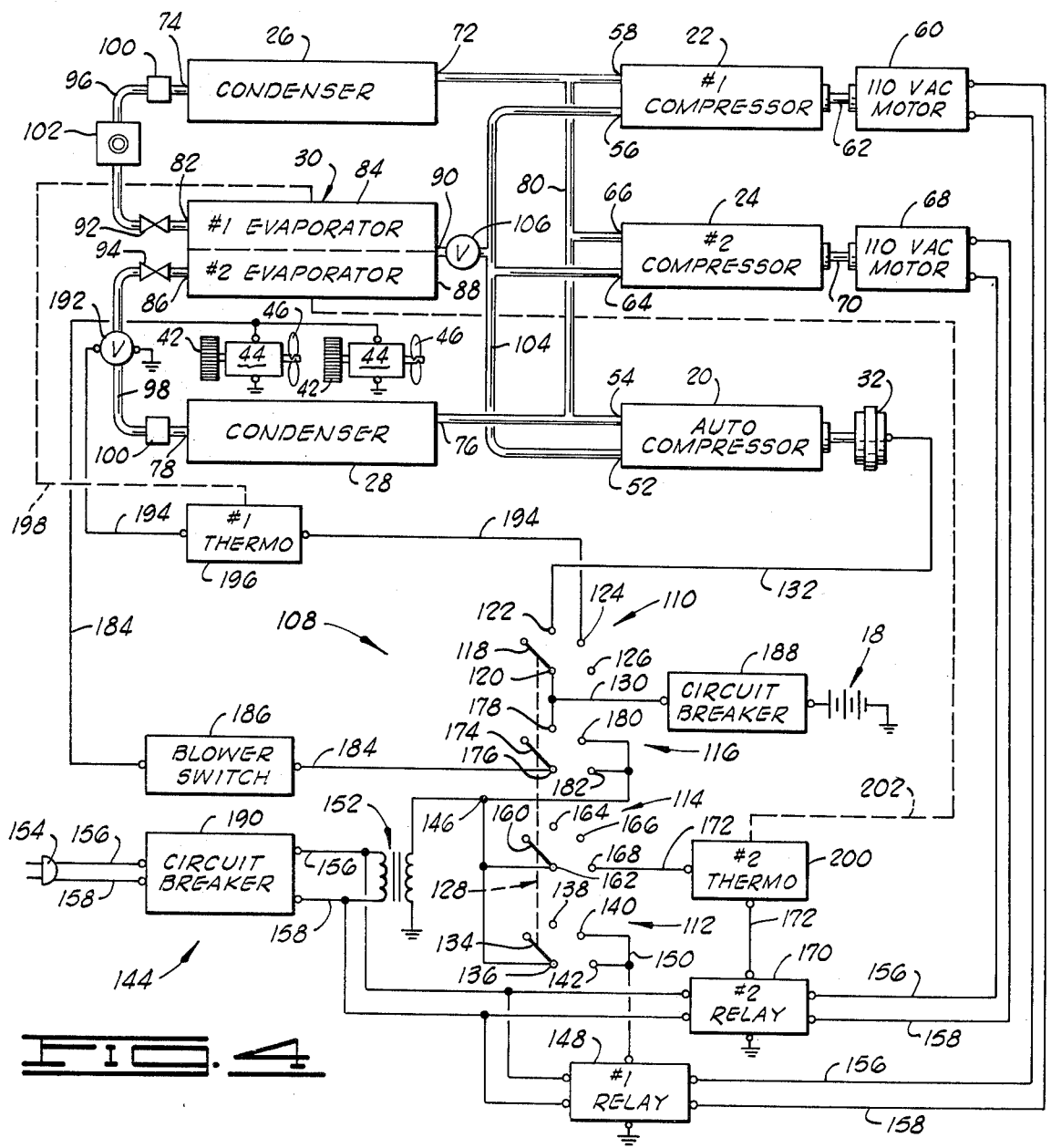
FIG. 3
FIG. 4

AIR CONDITIONING APPARATUS

CROSS REFERENCE TO RELATED APPLICATIONS

This patent application is a continuation-in-part of the applicant's co-pending application entitled "Air Conditioning System for a Motor Home Vehicle or the Like", Ser. No. 581,102, filed May 27, 1975, now U.S. Pat. No. 3,984,224, issued Oct. 5, 1976; which was a continuation-in-part of the applicant's then co-pending application entitled "Air Conditioning System for a Motor Home or the Like", Ser. No. 423,280, filed Dec. 10, 1973, now U.S. Pat. No. 3,885,398, issued May 27, 1975.

BACKGROUND OF THE INVENTION

1. Field of the Invention

This invention relates generally to an air conditioning apparatus employing a heat transfer medium for use in a vehicle having a large passenger area and, more particularly, but not by way of limitation, to an air conditioning apparatus having a vehicle engine driven compressor and a pair of electric motor driven compressors so that the passenger area may be cooled using either the engine driven compressor or one or both of the pair of motor driven compressors.

2. Description of the Prior Art

In general, air conditioning systems for vehicles having large passenger areas utilize either a single compressor driven by the engine of the vehicle or a separate electric motor driven compressor utilizing outside AC line voltage. However, systems of the first type place an unusually high burden on the engine of the vehicle, not only by the compressor itself but also by the condenser coil which is usually positioned in front of the engine thereby increasing the operating temperature of the engine. Systems of the latter type are only operative when connected to the AC line voltage thereby preventing the system from being used in transit. Even in systems utilizing both engine driven and motor driven compressors, such as the air conditioning systems described in the applicant's U.S. Pat. Nos. 3,885,398 and 3,984,224, described above, there is limited flexibility due to the presence of only one of each type of compressor.

SUMMARY OF THE INVENTION

The present invention contemplates an air conditioning apparatus employing a heat transfer medium for use in a vehicle having a large passenger area, comprising a vehicle engine driven compressor and a pair of electric motor driven compressors, all of which are connected to a pair of condenser coils via a discharge manifold and to a split evaporator coil via a suction manifold while each of the condenser coils is connected to one half of the evaporator coil via an expansion valve.

It is an object of the present invention to provide an air conditioning assembly for cooling a large passenger area of a vehicle using either a compressor driven by the engine of the vehicle, a first electric motor driven compressor or a first electric motor driven compressor in conjunction with a second electric motor driven compressor.

A further object of the invention is to provide an air conditioning system requiring a minimum of installation effort.

A still further object of the present invention is to provide an air conditioning apparatus wherein the blower motors are used in a dual mode to move air from the passenger area over the evaporator coil for return to the passenger area and to move air from outside the vehicle over the condenser coils for exhaust outside the vehicle.

Another object of the present invention is to provide an air conditioning system having the condenser coils remote from the engine compartment.

Other objects and advantages of the present invention will be evident from the following detailed description when read in conjunction with the accompanying drawings which illustrate the invention.

BRIEF DESCRIPTION OF THE DRAWINGS

FIG. 3 is a cross-sectional view of the air conditioning apparatus taken along the line 3—3 of FIG. 2.

FIG. 4 is a diagrammatic illustration of the air conditioning apparatus showing the electrical schematic and the conduit connections.

DESCRIPTION OF THE PREFERRED EMBODIMENT

Figure 1:
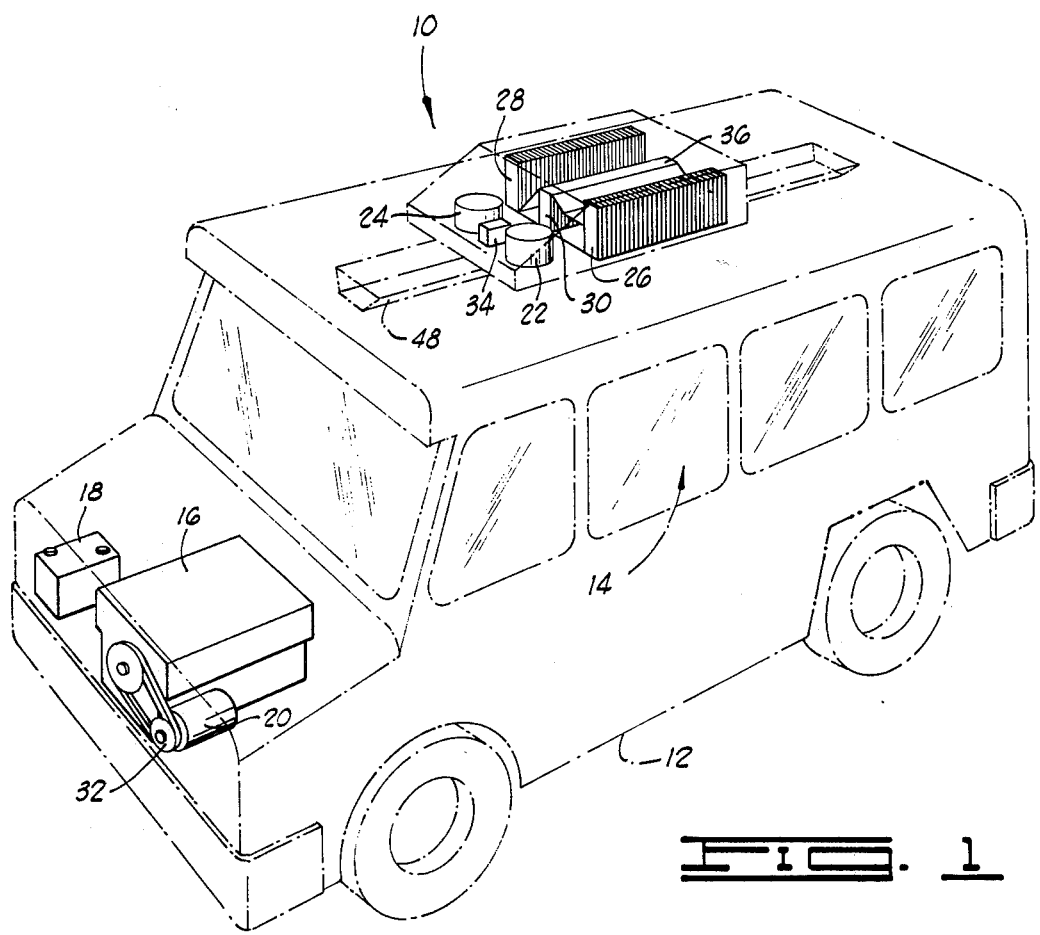
FIG. 1 is a perspective view of the air conditioning apparatus mounted on a vehicle having a large passenger area.
Figure 2:
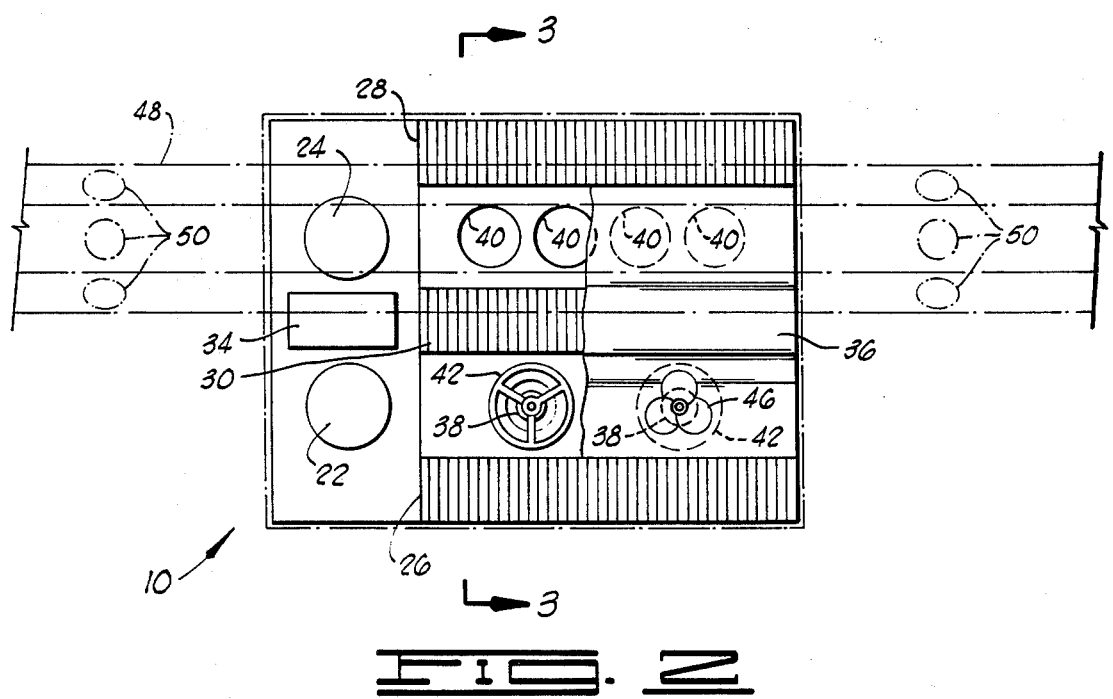
FIG. 2 is a partial cut-away, top plan view of the roof mounted portion of the air conditioning apparatus shown in FIG. 1.

Referring to the drawings in general and to FIG. 1 in particular, shown therein and referred to by the general reference number 10 is an air conditioning apparatus employing a heat transfer medium constructed in accordance with the preferred embodiment of the present invention. The air conditioning apparatus 10 is designed for use in a vehicle 12 having a large passenger area 14 and equipped with an engine 16 and a source of DC voltage, such as a battery 18. The air conditioning apparatus 10 is primarily comprised of a first compressor 20, a second compressor 22, a third compressor 24, a first condenser coil 26, a second condenser coil 28, and a split evaporator coil 30.

In the preferred embodiment, the first compressor 20 is disposed adjacent to the engine 16 and is connected thereto via an electromagnetic clutch 32, while the other primary components are disposed in a compact unit on the roof of the vehicle 12. More particularly, the evaporator coil 30 is disposed between the first and second condenser coils 26 and 28, respectively, in a parallel, spaced relationship. The second and third compressors 22 and 24, respectively, are disposed adjacent to the forward end of the evaporator coil 30 with the various control elements of the air conditioning apparatus 10 being enclosed between the second and third compressors 22 and 24, respectively, by a rectangular cover 34.

The evaporator coil 30 is separated from the first and second condenser coils 26 and 28, respectively by an appropriately shaped baffle 36, with a pair of inlet ports 38 (see FIG. 3) through the roof of the vehicle 12 providing an air circulation path from the passenger area 14 to one side of the evaporator coil 30, and a plurality of outlet ports 40 through the roof of the vehicle 12 providing an air circulation path between the passenger area 14 and the other side of the evaporator coil 30. A pair of interior air circulating fans 42 of the squirrel-cage type are disposed over the inlet ports 38 for moving air from the passenger area 14 over the evaporator coil 30 for return to the passenger area 14. The fans 42 are driven by a pair of multi-speed, AC/DC blower motors 44 which are disposed above the baffle 36 so that the heat produced thereby may be transferred to the air outside the vehicle. A pair of exterior air circulating fans 46 are connected to the ends of the blower motors 44 opposite the fans 42 for moving air from outside the vehicle 12 over the first and second condenser coils 26 and 28, respectively, in a well known manner. An air plenum 48 having a plurality of directional outlet ports 50 is preferably disposed inside the passenger area 14 over the outlet ports 40 to facilitate distribution of the air flowing through the outlet ports 40 throughout the passenger area 14.

In the preferred embodiment, each of the first and second condenser coils 26 and 28, respectively, has four rows of condenser coils in order to maintain a lower head pressure thereby enabling the use of more efficient refrigerants such as freon 22. In addition, the evaporator coil 30 also has four rows of coils with the input thereto being split so that access may be had to each pair of rows for reasons which will be made clear below.

As can be seen in FIG. 4, the first compressor 20 has a suction port 52 and a discharge port 54, and will be drivingly connected to the engine of the vehicle via the electromagnetic clutch 32 when the clutch 32 has a DC voltage connected thereto. The second compressor 22 has a suction port 56 and a discharge port 58, and is drivingly connected to a first 110 VAC electric motor 60 via a first drive shaft assembly 62. The third compressor 24 also has a suction port 64 and a discharge port 66, and is drivingly connected to a second 110 VAC electric motor 68 via a second drive shaft assembly 70.

The first condenser coil 26 has an inlet port 72 and an outlet port 74, while the second condenser coil 28 has an inlet port 76 and an outlet port 78. A discharge manifold 80 interconnects the discharge ports 54, 58 and 66 of each of the first, second and third compressors 20, 22 and 24, respectively, and the inlet ports 72 and 76 of each of the first and second condenser coils 26 and 28, respectively. As will be clear to those skilled in the art, the discharge manifold 80 conducts gaseous heat transfer medium from any one of the first, second and third compressors 20, 22 and 24, respectively, to either one or both of the first and second condenser coils 26 and 28, respectively.

The evaporator coil 30 has a first inlet port 82 providing access to a first half 84 of the evaporator coil 30, a second inlet port 86 providing access to a second half 88 of the evaporator coil 30, and an outlet port 90 providing an exhaust path from each of the halves 84 and 88 of the evaporator coil 30. The first inlet port 82 of the evaporator coil 30 has a conventional expansion valve 92 connected thereto, while the second inlet port 86 of the evaporator coil 30 has a second expansion valve 94 connected thereto.

A first liquid conduit 96 interconnects the outlet port 74 of the first condenser coil 26 and the first expansion valve 92, while a second liquid conduit 98 interconnects the outlet port 78 of the second condenser coil 28 and the second expansion valve 94. Preferably, dryers 100 are interposed in each of the first and second liquid conduits 96 and 98, respectively. In addition, a sight glass 102 is interposed in the first liquid conduit 96 to provide a visual indication of the presence of water vapor in the heat transfer medium.

A suction manifold 104 interconnects the outlet port 90 of the evaporator coil 30 and the suction ports 52, 56 and 64 of each of the first, second and third compressors 20, 22 and 24, respectively. As will be clear to those skilled in the art, the suction manifold 104 conducts gaseous heat transfer medium from the evaporator coil 30 to each of the first, second and third compressors 20, 22 and 24, respectively. If desired, a conventional evaporator temperature regulator valve 106 may be interposed between the outlet port 90 of the evaporator coil 30 and the suction manifold 104.

The air conditioning apparatus 10 also includes an electrical circuit 108 for controlling the operation of the various electrical components thereof. The electrical circuit 108 is comprised primarily of a first compressor control circuit 110, a second compressor control circuit 112, and a third compressor control circuit 114. In addition, the preferred embodiment has an air circulation control circuit 116.

The first compressor control circuit 110 is comprised primarily of a first 4-throw switch 118 having an input terminal 120, a first output terminal 122, a second output terminal 124 and a third output terminal 126. The first switch 118, which forms one pole of a 4-pole, 4-throw switch assembly 128, is selectively positionable in an off position, a first position connecting the input terminal 120 to the first output terminal 122, a second position connecting the input terminal 120 to the second output terminal 124, and a third position connecting the input terminal 120 to the third output terminal 126. The first switch 118 has the input terminal 120 thereof connected to the source of DC voltage 18 via a conductor 130 and the first output terminal 122 thereof connected to the clutch 32 via a conductor 132. Thus, when the first switch 118 is in the first position thereof, DC voltage will be connected to the clutch 32 thereby engaging the first compressor 20.

The second compressor control circuit 112 is comprised primarily of a second 4-throw switch 134 having an input terminal 136, a first output terminal 138, a second output terminal 140 and a third output terminal 142. The second switch 134, which forms a second pole of the switch assembly 128, is selectively positionable in an off position, a first position connecting the input terminal 136 to the first output terminal 138, a second position connecting the input terminal 136 to the second output terminal 140, and a third position connecting the input terminal 136 to the third output terminal 142. The second switch 134 has the input terminal 136 thereof connected to a source of AC voltage 144 via a conductor 146, and the second and third output terminals 140 and 142, respectively, thereof connected to a first double-pole, double-throw relay 148 via a conductor 150. More particularly, the input terminal 136 is connected to one side of the secondary winding of a step-down transformer 152 which has the primary winding thereof connected to AC line voltage via a plug 154 and a pair of conductors 156 and 158. The relay 148 is interposed in the conductors 156 and 158 between the source of AC voltage 144 and the first electric motor 60. Thus, when the second switch 134 is in one of the second and third positions, AC voltage will be connected to the first electric motor 60 thereby engaging the second compressor 22.

The third compressor control circuit 114 is comprised primarily of a third 4-thrown switch 160 having an input terminal 162, a first output terminal 164, a second output terminal 166 and a third output terminal 168.

The third switch 160, which forms a third pole of the switch assembly 128, is selectively positionable in an off position, a first position connecting the input terminal 162 to the first output terminal 164, a second position connecting the output terminal 162 to the second output terminal 166, and a third position connecting the input terminal 162 to the third output terminal 168. The third switch 160 has the input terminal 162 thereof connected to the source of AC voltage 144 via the conductor 146 and the third output terminal 168 thereof connected to a second double-pole, double-thrown relay 170 via a conductor 172. The second relay 170 is interposed in the conductors 156 and 158 between the source of AC voltage 144 and the second electric motor 68. Thus, when the third switch 160 is in the third position, AC voltage will be connected to the second electric motor 68 thereby engaging the third compressor 24.

The air circulation control circuit 116 is comprised primarily of a fourth 4-throw switch 174 having an input terminal 176, a first output terminal 178, a second output terminal 180 and a third output terminal 182. The fourth switch 174, which forms a fourth pole of the switch assembly 128, is selectively positionable in an off position, a first position connecting the input terminal 176 to the first output terminal 178, a second position connecting the input terminal 176 to the second output terminal 180, and a third position connecting the input terminal 176 to the third output terminal 182. The fourth switch 174 has the input terminal 176 thereof connected to the blower motors 44 via a conductor 184, the first output terminal 180 and 182, respectively, thereof connected to the source of AC voltage 144 via the conductor 146. Thus, when the fourth switch 174 is in the first position, DC voltage will be connected to the blower motors 44, while AC voltage will be connected to the blower motors 44 when the fourth switch 174 is in one of the second and third positions, thereby engaging the blower motors 44. If the blower motors 44 are of the multi-speed type, a multi-position blower switch 186 may be interposed in the conductor 184 to facilitate flexible operation of the blower motors 44.

In the preferred embodiment, a DC circuit breaker 188 is interposed in the conductor 130 between the source of DC voltage 18 and the first and fourth switches 118 and 174, respectively, to protect against circuit overloads. In addition, an AC circuit breaker 190 is interposed in the conductors 156 and 158 between the plug 154 and the transformer 152, the first relay 148 and the second relay 170.

If the second compressor 22 is of relatively small capacity, then it may be desirable to prevent the flow of the heat exchange medium through the second condenser coil 28 and the second half 88 of the evaporator coil 30 when only the second compressor 22 is engaged. If such is the case, a solenoid valve 192 may be interposed in the second fluid conduit 98, with the control terminal thereof being connected to the second output terminal 124 of the first switch 118 via a conductor 194. In addition, a first thermostat 196 may be interposed in the conductor 194, with the first thermostat 196 being responsive to the condition of the first half 84 of the evaporator coil 30 as indicated by the dashed line 198. Thus, the first thermostat 196 will cooperate with the first switch 118 to close the solenoid valve 192 when only the second compressor 22 is engaged and the temperature of the first half 84 of the evaporator coil 30 is above a predetermined minimum temperature selected via the first thermostat 196.

If desired, a second thermostat 200 may be interposed in the conductor 172, with the second thermostat 200 being responsive to the condition of the second half 88 of the evaporator coil 30 as indicated by the dashed line 202. Thus, the second thermostat 200 will cooperate with the third switch 160 to engage the second electric motor 68 only when the third switch 160 is in the third position and the temperature of the second half 88 of the evaporator coil 30 is above a predetermined minimum temperature selected via the second thermostat 200.

As will be clear to those skilled in the art, the air conditioning assembly 10 will be inoperative when the switches 118, 134, 160 and 174 are in the off position. When the switches 118, 134, 160 and 174 are in the first position, the first compressor 20 will be drivingly connected to the engine 16 via the clutch 32 and supply compressed heat transfer medium to both condenser coils 26 and 28 and all of evaporator coil 30. However, when the switches 118, 134, 160 and 174 are in the second position, the second compressor 22 will be driven by the first electric motor 60 and supply compressed heat transfer medium to only the first condenser coil 26 and the first half 84 of evaporator coil 30 unless the temperature of the first half 84 drops below the predetermined minimum established via the first thermostat 196. Finally, when the switches 118, 134, 160 and 174 are in the third position, both of the compressors 22 and 24 will be driven by the electric motors 60 and 68, respectively, and supply compressed heat transfer medium to both condenser coils 26 and 28 and all of evaporator coil 30 unless the temperature of the second half 88 of evaporator coil 30 drops below the predetermined minimum established via the second thermostat 200.

Changes may be made in the parts of the elements of the preferred embodiment as disclosed herein without departing from the scope and spirit of the present invention as defined in the following claims.

What is claimed is:

1. An air conditioning apparatus employing a heat transfer medium for use in a vehicle having a large passenger area and equipped with an engine and a source of DC voltage, the apparatus comprising:
   a first compressor having a suction port and a discharge port;
   clutch means for drivingly connecting the first compressor to the engine of the vehicle;
   a second compressor having a suction port and a discharge port;
   a first electric motor drivingly connected to the second compressor;
   a third compressor having a suction port and a discharge port;
   a second electric motor drivingly connected to the third compressor;
   a first condenser coil having an inlet port and an outlet port;
   a second condenser coil having an inlet port and and outlet port;
   discharge manifold means interconnecting the discharge ports of each of the first, second and third compressors and the inlet ports of each of the first and the second condenser coils, for conducting heat transfer medium from the first, second and third compressors to the first and second condenser coils;
   an evaporator coil having a first inlet port providing access to a first half of the evaporator coil, a second inlet port providing access to a second half of the evaporator coil, and an outlet port providing an exhaust path from each of the first and second halves of the evaporator coil;

a first expansion valve connected to the first inlet port of the evaporator coil;

a first liquid conduit interconnecting the outlet port of the first condenser coil and the first expansion valve;

a second expansion valve connected to the second inlet port of the evaporator coil;

a second liquid conduit interconnecting the outlet port of the second condenser coil and the second expansion valve;

suction manifold means interconnecting the outlet port of the evaporator coil and the suction ports of each of the first, second and third compressors, for conducting heat transfer medium from the evaporator coil to the first, second and third compressors;

air circulating means having an interior portion connected to the passenger area for moving air from the passenger area over the evaporator coil for return to the passenger area, and an exterior portion for moving air from outside the vehicle over the first and second condenser coils; and electrical circuit means comprising:
first compressor control circuit means connected to the source of DC voltage and to the clutch means, for connecting the DC voltage to the clutch means in a first position of the electrical circuit means;
second compressor control circuit means connected to a source of AC voltage and to the first electric motor, for connecting the AC voltage to the first electric motor in at least a second position of the electrical circuit means; and
third compressor control circuit means connected to the source of AC voltage and to the second electric motor, for connecting the AC voltage to the second electric motor in a third position of the electrical circuit means.

2. The air conditioning apparatus of claim 1 further defined to include:
valve means for preventing the flow of the heat transfer medium through the second condenser coil and the second half of the evaporator coil when the electrical circuit means is in the second position.

3. The air conditioning apparatus of claim 2 wherein the valve means is further characterized as having a portion responsive to the condition of the first half of the evaporator coil and the valve means prevents the flow of the heat transfer medium through the second condenser coil and the second half of the evaporator coil only when the electrical circuit means is in the second position and the temperature of the first half of the evaporator coil is above a predetermined minimum temperature.

4. The air conditioning apparatus of claim 1 wherein the third compressor control circuit means is further characterized as having a portion responsive to the condition of the second half of the evaporator coil and the third compressor control circuit means connects the AC voltage to the second electric motor only when the electrical circuit means is in the third position and the temperature of the second half of the evaporator coil is above a predetermined minimum temperature.

5. The air conditioning apparatus of claim 1 wherein the air circulating means is further defined to comprise:
means providing an air circulation path from the passenger area to one side of the evaporator coil and from the other side of the evaporator coil to the passenger area;
internal air circulating fan means disposed in the air circulation path for moving air from the passenger area over the evaporator coil for return to the passenger area; and
an AC/DC blower motor drivingly connected to the internal air circulating fan; and wherein the electrical circuit means is further defined to include:
air circulation control circuit means connected to the sources of DC and AC voltage and to the blower motor, for connecting the DC voltage to the blower motor in the first position of the electrical circuit means and the AC voltage to the blower motor in the second and third positions of the electrical circuit means.

6. The air conditioning apparatus of claim 5 wherein the air circulating means is defined further to include:
external air circulating fan means drivingly connected to the blower motor or moving air from outside the vehicle over the first and second condenser coils.

7. The air conditioning apparatus of claim 1 wherein the second and third compressors, the first and second electric motors, the first and second condenser coils, the evaporator coil, the discharge and suction manifold means, the first and second expansion valves, the first and second liquid conduits, the air circulating means and the electrical circuit means are disposed in a compact unit on the roof of the vehicle.

* * * * *

UNITED STATES PATENT OFFICE
CERTIFICATE OF CORRECTION

Patent No. 4,051,691  Dated October 4, 1977

Inventor(s) Claude W. Dawkins

It is certified that error appears in the above-identified patent and that said Letters Patent are hereby corrected as shown below:

Column 5, line 31, after the word "terminal" and before the word "180" should be inserted --178 thereof connected to the source of DC voltage 18 via the conductor 130 and the second and third output terminals--.

Column 8, line 40, "or" should be --for--.

Signed and Sealed this

Twenty-seventh Day of December 1977

[SEAL]

Attest:

RUTH C. MASON  
Attesting Officer

LUTRELLE F. PARKER  
Acting Commissioner of Patents and Trademarks